Sept. 4, 1928.
A. E. ANDERSON
1,683,147
SYSTEM OF ELECTRICAL DISTRIBUTION
Filed Nov. 1, 1924
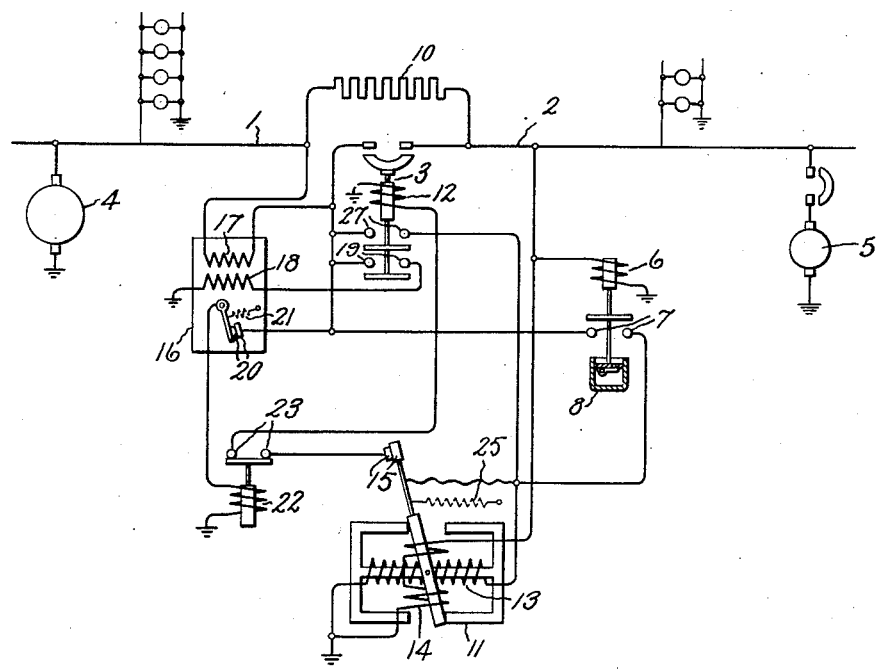
Inventor:
Arvid E. Anderson,
by
His Attorney.

Patented Sept. 4, 1928.

1,683,147

UNITED STATES PATENT OFFICE.

ARVID E. ANDERSON, OF SCOTIA, NEW YORK, ASSIGNOR TO GENERAL ELECTRIC COMPANY, A CORPORATION OF NEW YORK.

SYSTEM OF ELECTRICAL DISTRIBUTION.

Application filed November 1, 1924. Serial No. 747,395.

My invention relates to systems of electrical distribution, and particularly to systems in which electrical energy is adapted to be transferred from one circuit to another under predetermined conditions.

In some localities there are small isolated systems of electrical distribution which, under normal conditions, are energized independently. In order that the isolated systems may not remain deenergized upon the failure of the respective sources, arrangements usually are provided whereby an auxiliary or reserve source of electrical energy is connected to the systems when they become deenergized.

One object of my invention is to provide an arrangement for preventing an auxiliary or reserve source from being connected to a deenergized isolated section when the load connected to the deenergized system exceeds a predetermined amount. More broadly, this object of my invention is to provide an arrangement for connecting together two electric circuits, which normally are energized independently, when one of the two circuits is deenergized and the load connected thereto is between certain values.

Another object of my invention is to provide an improved arrangement for disconnecting an isolated system from a reserve source when the isolated system is energized independently by its normal sources in order that an overload or short circuit on the system normally supplied by the reserve source may not overload the sources connected to the isolated system. More broadly, this object of my invention is to provide an improved arrangement whereby two electric circuits, which are adapted to be energized independently, are connected together when one of the circuits becomes deenergized under certain load conditions, and are disconnected from each other when both of the circuits are energized independently.

In accordance with my invention, I provide a circuit breaker between the two electric circuits and control the opening of the circuit breaker by means of a reverse current relay and the closing of the circuit breaker by means of a reclosing relay which operates in accordance with the load connected to one of said circuits and a voltage relay which operates to permit the operation of the reclosing relay when said one of said circuits is deenergized.

My invention will be better understood from the following description, taken in connection with the accompanying drawing, and its scope will be pointed out in the appended claims.

Referring to the accompanying drawing, which shows diagrammatically a system of electrical distribution embodying my invention, 1 and 2 represent two conductors which are arranged to be connected together by a circuit breaker 3 which may be of any suitable type. As shown in the drawing, the conductor 1 is one side and the ground is the other side of a direct current circuit which is supplied by a generator 4, and the conductor 2 is one side and the ground is the other side of a direct current circuit which is supplied by a generator 5.

In the arrangement shown, it is assumed that the conductor 1 and ground is part of a large direct current network which is energized substantially all of the time whereas the conductor 2 is part of a small system which may be deenergized due to the failure of the source or sources connected thereto. Since it is desirable to have the circuit, of which the conductor 2 and ground forms a part, continuously energized, I provide an arrangement whereby the circuit breaker 3 is closed when this circuit is deenergized under certain load conditions. This arrangement comprises a relay 6 which is responsive to the voltage between the conductor 2 and ground. As long as the voltage between the conductor 2 and ground is above a predetermined value, the relay 6 maintains its contacts 7 open so that the closing circuit for the circuit breaker 3 cannot be completed. When, however, the voltage decreases below a predetermined value, the relay 6 closes its contacts 7. The closing of these contacts permits the closing circuit of the circuit breaker 3 to be completed in a manner hereinafter described. Preferably, suitable means, such as a dashpot 8, is provided whereby the closing circuit of the circuit breaker 3 cannot be completed until after the voltage between the conductor 2 and ground has been below a predetermined value for a predetermined length of time. Such an arrangement prevents the closing of the circuit breaker 3 in response to fluctuations in the voltage between the conductor 2 and ground.

If the cause of the relay 6 closing its contacts 7 is an overload or short circuit between the conductor 2 and ground which effects the disconnection of the source 5 from the system, it is evident that the circuit breaker 3 should not be closed until after the short circuit or overload has been removed. For accomplishing this result, I have employed a modification of the automatic reclosing circuit breaker system disclosed and claimed in the U. S. Letters Patent 1,567,016 to Oliver C. Traver and assigned to the same assignee as this application. This reclosing system comprises a load indicating resistor 10 which is arranged to be connected in series between the conductors 1 and 2 when the circuit breaker 3 is open and a reclosing relay 11 which operates in response to the voltage between the conductor 2 and ground to complete the circuit of the closing coil 12 of the circuit breaker 3 when the load resistance is above a predetermined value. Preferably the relay 11 is of the type disclosed and claimed in Letters Patent 1,541,618 granted June 9, 1925 to H. W. Brown. As shown in the drawing the reclosing relay 11 has a polarizing winding 13 which is connected between the conductor 1 and ground when the contacts 7 of the relay 6 are closed, and an operating winding 14 which may be and is shown as permanently connected between the conductor 2 and ground, said winding being arranged so that when the circuit of the polarizing winding is completed the contacts 15 are closed when the voltage impressed upon the winding 14 is above a predetermined value. It will be observed that when the circuit breaker 3 is open and the source 5 is disconnected, a small current flows through the load indicating resistor 10, which has a high resistance value, and the load connected between the conductor 2 and ground; and the voltage drop produced between the conductor 2 and ground by this small current varies with the resistance of the load connected between the conductor 2 and ground. Therefore, by properly adjusting the relay 11, the contacts 15 will close whenever the load connected between the conductor 2 and ground is less than any desired value. The construction of the particular relay shown is such that the relay also closes its contacts 15 when only the operating winding 14 is energized, provided the voltage impressed on the winding 14 is great enough, and will maintain its contacts 15 closed under these conditions as long as the voltage impressed on the winding 14 is above a predetermined value. The voltage between conductor 2 and ground at which relay 11 will open its contacts 15 when only the winding 14 is energized is less than the voltage required to close the contacts when only the winding 14 is energized and is greater than the voltage required to close the contacts 15 when both of the relay windings are energized.

The movement of the relay armature to its contact closed position when only the winding 14 is energized is due to the coaction between the magnetism produced in the movable armature by the current in winding 14 and the residual magnetism in the main magnetic poles. In practice it has been found that with only the winding 14 energized the relay 11 closes its contacts 15 in response to a voltage considerably below the normal voltage between conductor 2 and ground.

After the relay armature has moved to its contact closed position a much smaller voltage across the terminals of the winding 14 is sufficient to maintain the relay in its contact closed position than is required to move the armature from its contact open position to its contact closed position. This operation is due principally to the fact that when the movable armature is in the contact closed position the air gaps between the magnetic poles of the armature and the associated poles of opposite polarity of the main magnetic structure are closed thereby decreasing the reluctance of the magnetic circuits through them.

The purpose of the polarizing winding 13 is to increase the strength of the main poles of the relay so that the relay can close its contacts in response to a much lower voltage across winding 14 than is required when only the winding 14 is energized.

In order to prevent the source 5 from being overloaded by supplying current to the load connected between the conductor 1 and ground, which it is assumed greatly exceeds the capacity of the source 5, a reverse current relay 16 is provided for effecting the opening of the circuit breaker 3 when a predetermined amount of current flows from the conductor 2 to the conductor 1. This relay has a current winding 17 which is connected in series with the conductors 1 and 2 when the circuit breaker 3 is closed and a potential winding 18 which is connected between the conductor 2 and ground by the auxiliary contacts 19 on the circuit breaker 3 when it is closed. Normally, the contacts 20 of the reverse current relay 16 are held closed by the spring 21, but as soon as a predetermined current flows through the current coil 17 from the conductor 2 to the conductor 1, the relay 16 opens its contacts 20 and deenergizes the control relay 22 to effect the opening of the contacts 23 in the circuit of the closing coil 12 of the circuit breaker 3.

The operation of the system shown is as follows: It will be assumed first that both circuits are independently energized by their respective sources and that the circuit breaker 3 is open. Under these conditions, the control devices are in the positions shown. The contacts 7 are open since normal voltage is impressed upon the coil of the relay 6. The contacts 15 of the relay 11 are closed since full voltage is impressed on the operating winding 14. The spring 21 maintains the contacts 20 of the reverse current relay 16 closed. The contacts 23 are closed since the contacts 20 connect the coil of relay 22 between the conductor 1 and the ground. So long as the circuit between the conductor 2 and ground is independently energized and the load connected thereto is normal, the control devices remain in the positions shown.

Whenever the voltage between the conductor 2 and ground decreases below a predetermined value and remains below this value for a predetermined length of time, as is the case when source 5 is disconnected and the load connected thereto is within certain limits, the relay 6 closes its contacts 7, thereby connecting the polarizing winding 13 of the reclosing relay 11 between the conductor 1 and ground. If the resistance of the load connected between the conductor 2 and ground is above a predetermined value, the voltage drop produced across this load by current flowing from the source 4 through the load indicating resistor 10, is sufficient to cause the relay 11 to maintain its contacts 15 closed. If, however, the load resistance is below this value, the relay 11 opens its contacts 15.

The closing of the contacts 7 while the contacts 15 are closed completes the circuit of the closing coil 12 of the circuit breaker so that the circuit breaker 3 is closed. This circuit is from conductor 1, through the current winding 17 of the reverse current relay 16, contacts 7 of the voltage relay 6, contacts 15 of the reclosing relay 11, contacts 23 of the relay 22, closing coil 12 of the circuit breaker 3 to ground. The closing of the circuit breaker 3 connects the conductors 1 and 2 together so that full voltage is impressed between conductor 2 and ground. Consequently, relay 6 immediately opens its contacts 7, thereby opening the energizing circuit of the polarizing winding 13 of the reclosing relay 11. The auxiliary contacts 27 on the circuit breaker 3, however, complete a circuit around the contacts 7 so that the reclosing relay 11 maintains its contacts 15 closed while the circuit breaker 3 is closed thereby insuring that the contacts 15 in the circuit of the closing coil 12 are maintained closed as long as the circuit breaker 3 is closed.

The closing of the auxiliary contacts 19 on the circuit breaker 3 connects the potential coil 18 of the reverse current relay 16 between the conductor 1 and ground. So long as the current flows from conductor 1 to conductor 2, the relay 16 does not open its contacts 20. When, however, the source 5 again supplies current to its respective circuit, the amount of current supplied from conductor 1 to conductor 2 decreases and under certain conditions will reverse. When this reverse current is above a predetermined value, preferably a small value, the reverse current relay 16 opens its contacts 20, thereby effecting the deenergization of the closing coil of the circuit breaker 3. The opening of the circuit breaker 3 inserts the load indicating resistor 10 in series with the conductors 1 and 2 so that the two circuits are independent of each other so far as the transfer of any appreciable amount of electrical energy from one to the other is concerned. The opening of the auxiliary contacts 19 effects the closing of the contacts 20, so that the control devices are in the positions assumed at the beginning of the description of the operation.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:—

1. In a system of electrical distribution, two electric circuits adapted to be energized independently, a circuit breaker for connecting said electric circuits together, power directional means for effecting the opening of said circuit breaker when a predetermined amount of current flows from one of said electric circuits to the other, and means controlled by the voltage across said one of said electric circuits for effecting the reclosure of said circuit breaker.

2. In a system of electrical distribution, two electric circuits adapted to be energized independently, a circuit breaker for connecting said electric circuits together, and means for effecting the opening of said circuit breaker when current flows between said circuits in a predetermined direction and for effecting the closing of said circuit breaker when one of said circuits is not energized independently of the other and the load connected to said one of said load circuits is within predetermined limits.

3. In a system of electrical distribution, two electric circuits, means adapted to supply current independently to each of said electric circuits, the capacity of the independent current supplying means for one of said circuits being smaller than the capacity of the independent current supplying means for the other electric circuit, a circuit breaker for connecting said circuits together, and means for effecting the opening of said circuit breaker when current flows from the circuit which is adapted to be supplied by the smaller current supplying means to the other circuit and for effecting the closing of said circuit breaker in response to a predetermined electrical condition of the circuit which is adapted to be supplied by the smaller current supplying means.

4. In a system of electrical distribution, two electric circuits, means adapted to supply current independently to each of said electric circuits, the capacity of the independent current supplying means for one of said circuits being smaller than the capacity of the independent current supplying means for the other electric circuit, a circuit breaker for connecting said circuits together, and means for effecting the opening of said circuit breaker when current flows from the circuit which is adapted to be supplied by the smaller current supplying means to the other circuit and for effecting the closing of said circuit breaker when the circuit which is adapted to be supplied by the smaller current supplying means is not supplied thereby and the load connected to said last mentioned circuit is within predetermined limits.

5. In a system of electrical distribution, two electric circuits, means adapted to supply current independently to each of said electric circuits, the capacity of the independent current supplying means for one of said circuits being smaller than the capacity of the independent current supplying means for the other electric circuit, a circuit breaker for connecting said circuits together, means for effecting the opening of said circuit breaker when current flows from the circuit which is adapted to be supplied by the smaller current supplying means to the other circuit, and reclosing means controlled by the resistance of the load connected to the circuit which is adapted to be supplied by the smaller current supplying means for effecting the closing of said circuit breaker.

6. In a system of electrical distribution, two electric circuits, means adapted to supply current independently to each of said electric circuits, the capacity of the independent current supplying means for one of said circuits being smaller than the capacity of the independent current supplying means for the other electric circuit, a circuit breaker for connecting said circuits together, a reverse current relay operative to effect the opening of said circuit breaker when current flows from the circuit which is adapted to be supplied by the smaller current supplying means to the other circuit, load responsive means operative to effect the closing of said circuit breaker, and means responsive to the voltage across said circuit which is adapted to be supplied by the smaller current supplying means for preventing said load responsive means from effecting the closing of said circuit breaker.

7. In a system of electrical distribution, two electric circuits, a circuit breaker for connecting said electric circuits together, a reverse current relay for effecting the opening of said circuit breaker when current flows from one of said circuits to the other circuit, current limiting means adapted to be connected in series with said circuits when said circuit breaker is open, a reclosing relay responsive to the voltage across said one of said electric circuits for effecting the closing of said circuit breaker, and means responsive to the voltage across said one of said electric circuits for permitting said reclosing relay to effect the reclosing of said circuit breaker only when the voltage across said one of said electric circuits is below a predetermined value.

8. In a system of electrical distribution, two electric circuits, a circuit breaker for connecting said electric circuits together, a reverse current relay for effecting the opening of said circuit breaker when current flows from one of said circuits to the other circuit, current limiting means adapted to be connected in series with said circuits when said circuit breaker is open, a closing circuit for said circuit breaker, a relay responsive to the voltage across said one of said electric circuits for controlling contacts in said closing circuit whereby said closing circuit can be completed when the voltage across said one of said electric circuits is less than a predetermined value, and another relay responsive to the voltage across said one of said electric circuits for controlling contacts in said closing circuit whereby said last mentioned contacts are closed when the voltage across said one of said electric circuits is above a predetermined value.

9. In a system of electrical distribution, two electric circuits, a circuit breaker for connecting said electric circuits together, means for effecting the opening of said circuit breaker only when a predetermined amount of current flows from a predetermined one of said electric circuits to the other electric circuit, and means for effecting the closing of said circuit breaker when the voltage in said predetermined one of said electric circuits is less than a predetermined value.

10. In a system of electrical distribution, two electric circuits, a circuit breaker for connecting said electric circuits together, power directional means for effecting the opening of said circuit breaker when a predetermined amount of current flows from one of said electric circuits to the other electric circuit, and means for effecting the closing of said circuit breaker when the voltage in said one of said electric circuits is less than a predetermined value and the load connected to said one of said electric circuits is within predetermined limits.

11. In a system of electric distribution, two electric circuits, a circuit breaker for connecting said electric circuits together, a reverse current relay for effecting the opening of said circuit breaker when current flows from one of said circuits to the other one of said circuits, and a voltage relay connected across said one of said electric circuits for effecting the closing of said circuit breaker when the voltage across said one of said circuits is less than a predetermined value.

In witness whereof, I have hereunto set my hand this 31st day of October, 1924.

ARVID E. ANDERSON.